Figure 1:
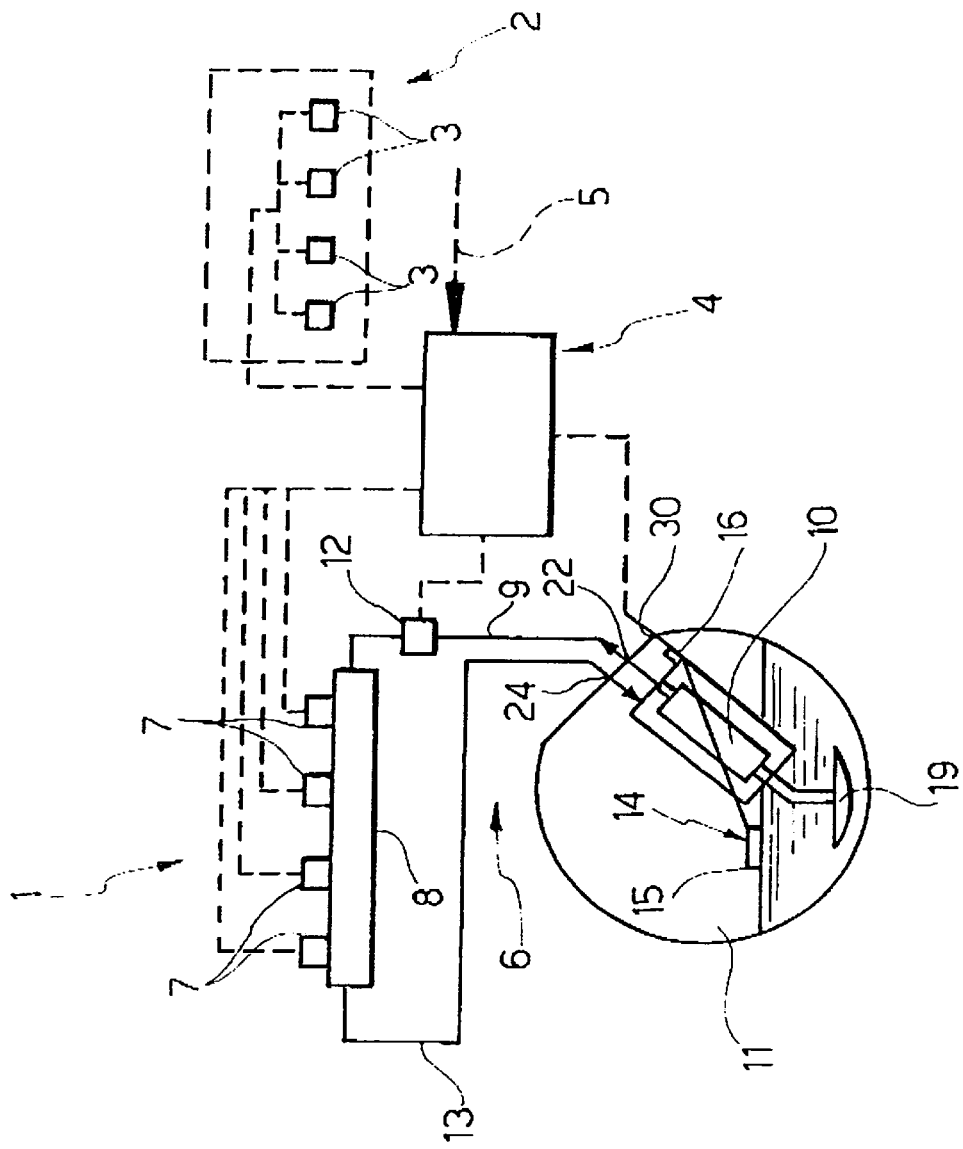

United States Patent
Ferrera et al.

[11] Patent Number: 6,050,237
[45] Date of Patent: Apr. 18, 2000

[54] LPG RESERVOIR FOR AN INTERNAL COMBUSTION ENGINE ADAPTED TO BE OPERATED SELECTIVELY WITH GASOLINE AND LPG

[75] Inventors: Massimo Ferrera; Riccardo Gozzelino; Pietro Gianotti; Filippo Audisio, all of Orbassano, Italy

[73] Assignee: C.R.F. Societa' Consortile per Azioni, Orbassano, Italy

[21] Appl. No.: 09/209,768

[22] Filed: Dec. 11, 1998

[30] Foreign Application Priority Data

Dec. 12, 1997 [IT] Italy .................................. TO97A1084

[51] Int. Cl.[7] .................................................. F02M 21/02
[52] U.S. Cl. ........................................ 123/276 E; 123/575
[58] Field of Search ..................................... 123/276, 575, 123/576, 525

[56] References Cited

U.S. PATENT DOCUMENTS

| | | | |
|---|---|---|---|
| 3,783,849 | 1/1974 | Bramfitt | 123/576 |
| 3,794,000 | 2/1974 | Hodgkinson | 123/576 |
| 4,353,345 | 10/1982 | Ebihara | 123/575 |
| 5,592,924 | 1/1997 | Audisio et al. | 123/575 |
| 5,628,294 | 5/1997 | Krieckaert et al. | 123/575 |

*Primary Examiner*—Marguerite McMahon
*Attorney, Agent, or Firm*—Sughrue, Mion, Zinn, Macpeak & Seas, PLLC

[57] ABSTRACT

A LPG reservoir for an internal combustion engine adapted to be operated selectively with LPG and gasoline includes a pump unit which has connecting elements for a LPG outlet conduit and a LPG return conduit, as well as a sensor device for sensing the level of LPG in the reservoir.

3 Claims, 2 Drawing Sheets

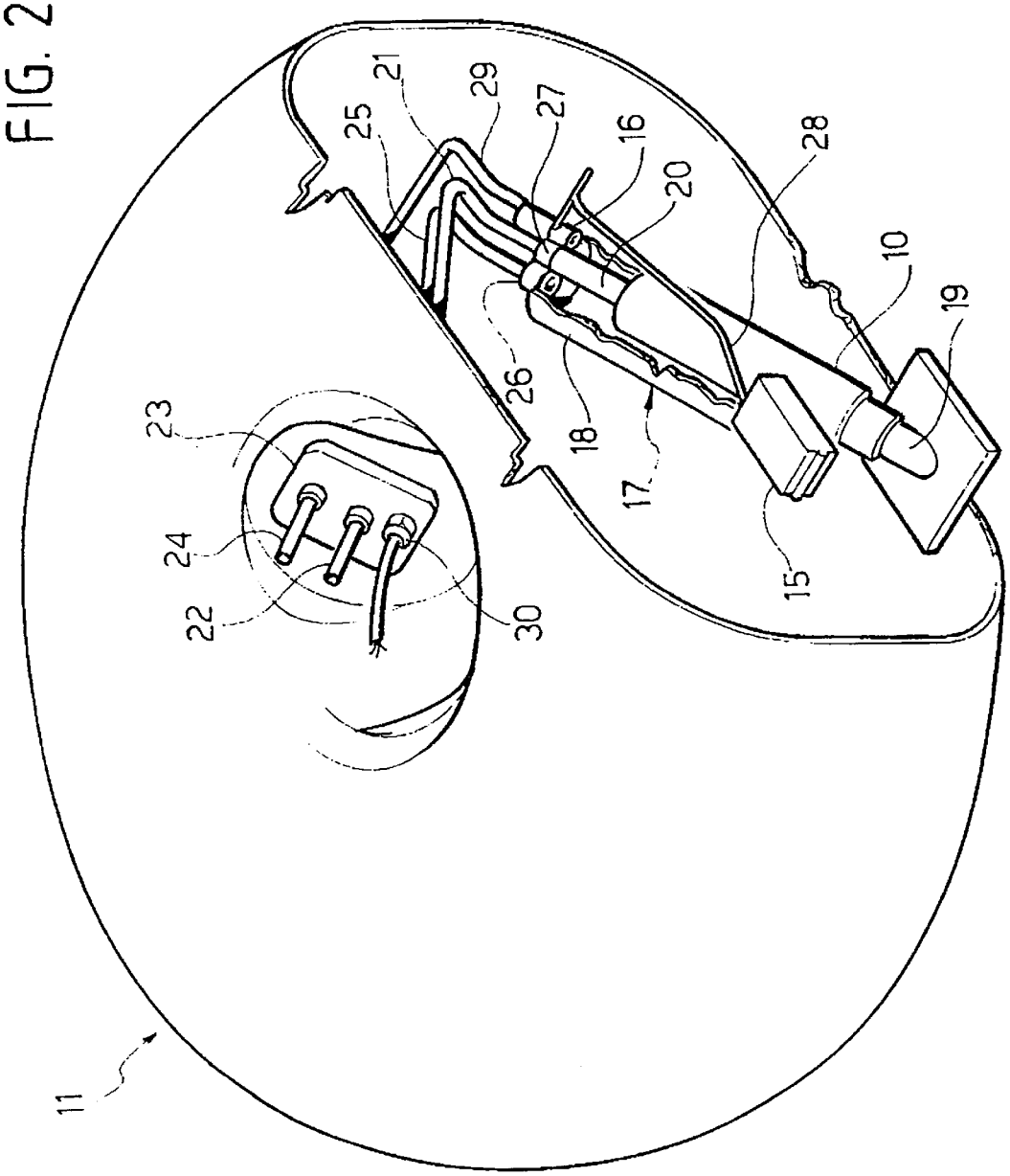

LPG RESERVOIR FOR AN INTERNAL COMBUSTION ENGINE ADAPTED TO BE OPERATED SELECTIVELY WITH GASOLINE AND LPG

The present invention relates to a LPG reservoir which is for use in a fuel feeding system for an internal combustion engine adapted to be operated selectively with gasoline and LPG.

Fuel feeding systems of this type are known (see European patent EP-B-0 725 205 of the same Applicant and the corresponding U.S. Pat. No. 5,592,924), which comprise:

gasoline feeding means including a plurality of injectors associated with the engine cylinders, electronic control means for controlling the gasoline injectors, adapted to receiving signals indicative of various parameters of operation of the engine as well as to controlling the gasoline injectors accordingly, and LPG feeding means, including:
  a plurality of LPG injectors associated with the engine cylinders,
  a LPG feeding manifold or rail for feeding LPG to said injectors,
  a LPG feeding conduit for feeding LPG from the reservoir to said rail,
  a return conduit for returning the LPG fed in excess to the injectors to the reservoir,
  sensor means for sensing the LPG level in the reservoir,
  a pump interposed in the LPG feeding conduit for feeding LPG from the reservoir to the rail,
said electronic control means being adapted to controlling switching between the gasoline operation mode and the LPG operation mode and being further adapted to controlling the LPG injectors in the LPG operation mode.

So-called "bi-fuel"-type feeding systems are also known, i.e. systems adapted to be operated either with gasoline or with LPG, in which an automatic switch from the LPG mode to the gasoline mode is caused when the LPG level in the reservoir decreases below a minimum admissible value.

The object of the present invention is that of providing a LPG reservoir which is to be used in a system of the above indicated type which has a relatively simple and efficient structure.

In view of achieving this object, the invention provides a reservoir which is to be used in a system having the above indicated features, characterized in that it includes:

a pump unit, including said pump, which is arranged within the reservoir, having an intake mouth adjacent to the bottom of the reservoir and an outlet conduit connected to an outlet connecting element opening on the outside of the reservoir, a return connecting element, also opening at the outside of the reservoir, for connecting said return conduit for returning LPG from the rail to the reservoir with the inner chamber of the reservoir, and a level sensor, including a transducer mechanically connected to a float and adapted to send an electric signal indicative of the position of the float, said float and said transducer being both supported by the pump unit and said transducer having its outlet electric wire connected to the outside through a cable guiding sleeve which is arranged through the reservoir wall.

In a preferred embodiment, said outlet connecting element, said return connecting element and said cable guiding sleeve are all carried by a single plate connected to the reservoir wall.

Furthermore, also in said embodiment, the pump unit includes a canister surrounding the pump casing which supports said transducer and in which further opens a conduit inside the reservoir which is connected to said return connecting element.

Due to the above mentioned features, the reservoir according to the invention has a relatively simple structure, and yet is extremely efficient, is adapted to be assembled with relatively simple and rapid operations and is able to operate in the best way in a fuel feeding system of the above described type. In particular, the pump unit forming part of the reservoir includes both the outlet conduit, and the return conduit and the level sensing device which is to be used both to enable the user to control the LPG level in the reservoir and to enable the system to automatically cause switching from the LPG mode to the gasoline mode when the LPG level in the reservoir decreases below the minimum admissible value for proper operation of the pump.

Further features and advantages of the invention will become apparent from the description which follows with reference to the annexed drawings, given purely by way of non limiting example, in which:

FIG. 1 shows a diagram of a fuel feeding system for internal engine adapted to operate with gasoline or LPG, which includes the reservoir according to the invention, and FIG. 2 is a diagrammatic perspective view, partially in cross section of the reservoir according to the invention.

In FIG. 1, reference numeral 1 generally designates a feeding system for an internal combustion engine of a motor-vehicle, adapted to operate selectively with gasoline and LPG. The system 1 includes a subsystem 2 for feeding gasoline to the engine, including a plurality of gasoline injectors 3 associated with the various cylinders of the engine and controlled by an electronic control unit 4 on the basis of signals 5 sent to unit 4 and indicative of various parameters of operation of the engine. The subsystem 2 can be provided as a conventional electronically controlled gasoline injection system and therefore is not illustrated in detail in the present description and in the annexed drawings.

The feeding system 1 according to the invention further includes a subsystem 6 for feeding LPG to the engine. Systems of this type have been known and used and have also formed the subject of previous patents of the same Applicant (see for example European patent EP-B-0 725 208 and the corresponding U.S. Pat. No. 5,592,924). The subsystem 6 comprises a plurality of LPG injectors 7 which are associated with the various cylinders of the engine and communicate with a feeding manifold or rail 8. The rail 8 is connected through a conduit 9 to the outlet of a pump 10, arranged inside a LPG reservoir 11. A pressure sensor 12 is arranged in conduit 9. The LPG fed in excess to the injectors 7 returns to the reservoir 11 through a return conduit 13 which communicates with reservoir 11 by means of a one-way valve (not shown in the drawing) which prevents a LPG flow through conduit 13 towards rail 8. Inside reservoir 11 there is arranged a level sensor 14, comprising a float 15 and a transducer 16. Sensor 12 and transducer 16 send signals indicative of the conduit pressure 9 and LPG level within reservoir 11 to the electronic control unit 4.

The electronic control unit 4 is provided for controlling also switching between the gasoline operation mode and the LPG operation mode. During the LPG operation mode, the same electronic control unit 4 attends to controlling the LPG injectors 7 on the basis of the signal received from sensor 12 which detects the LPG pressure (which is a function of the temperature), so as to enable the opening time of the injectors 7 to be controlled accordingly.

As visible in FIG. 2, which shows a preferred embodiment of the reservoir 11, in which this reservoir has, in a way known per se, a toroidal structure, the pump 10 forms part of a pump unit 17, including a canister 18 having a cylindrical shape and surrounding pump 10. The canister 18 has been illustrated in cross-section in FIG. 2 for an easier representation of pump 10. Pump 10 has an intake mouth 19 at its bottom, adjacent to the reservoir bottom and an outlet conduit 20 at its top. Conduit 20 opens above canister 18 and is connected by means of a conduit 21 arranged inside the reservoir to an outlet connecting element 22 which is arranged through the wall of reservoir 11 and is carried by a plate 23. The outlet connecting element 22 is connected to conduit 9 which feeds LPG to rail 8 (FIG. 1). The same plate 23 also carries a return connecting element 24 for connecting the return conduit 13. Preferably, the return connecting element 24 also includes a one-way valve, which prevents a LPG flow from reservoir 11 to rail 8 through conduit 13, similarly to what has been proposed in previous Italian patent application TO96A000983 and in parallel European patent application No. 97830620.7 of the same Applicant, which were still secret at the priority date of the present application. Due to the use of this one-way valve, it is not necessary to provide a pressure regulating device in conduit 13 as shown instead in other previous patents of the Applicant which have been mentioned above (EP-B-0 725 205 and U.S. Pat. No. 5,592,924).

The return connecting element 24 is connected to a conduit 25 arranged inside reservoir 11 which ends in a connecting element 26 carried by the upper end of canister 18. This upper end of canister 18 also carries a connecting element 27 for connecting the outlet conduit 20 of the pump with conduit 21 connected to the outlet connecting element 22.

Finally, the upper end of canister 18 of the pump unit 17 also supports the transducer 16 of the level sensor device 14. This transducer is mechanically connected to a rocking lever 28 whose radially outer end has the float 15. The transducer 16 includes an outlet electric wire 29 which is connected to the outside of the reservoir through a cable guiding sleeve 30 which is also carried by plate 23 on which the two connecting elements 22, 24 are mounted.

As shown, therefore, the reservoir according to the invention has a simple and at the same time efficient structure, which is adapted to be assembled with easy and rapid operations, due to that the pump unit 17 includes also the level sensor device and the connecting elements 26, 27 for the two inner conduits 25, 21, as well as due to that a single plate 23 at the outside of the reservoir carries both the outlet connecting element 22, and the return connecting element 24 and the cable guiding sleeve 30 for connecting the outlet electric wire 29 to the level sensor.

As already illustrated above, the reservoir according to the invention is adapted to be used in a particularly advantageous way in a fuel feeding system in which the electronic control means automatically attend to switching the system from the gasoline mode to the LPG mode when the LPG level in the reservoir 11 lowers below a minimum value for proper operation of the pump 17.

Naturally, while the principle of the invention remains the same, the details of construction and the embodiments may widely vary with respect to what has been described and illustrated purely by way of example, without departing from the scope of the present invention.

What is claimed is:

1. LPG reservoir, which is for use in a fuel feeding system for an internal combustion engine adapted to be operated selectively with gasoline and LPG, said system comprising:

gasoline feeding means, including a plurality of injectors associated with the engine cylinders, and electronic control means for controlling the gasoline injectors, adapted to receiving signals indicative of various parameters of operation of the engine as well as to controlling the gasoline injectors accordingly, and LPG feeding means, including:
a plurality of LPG injectors associated with the engine cylinders,
a LPG feeding manifold or rail for feeding LPG to said injectors,
a LPG reservoir,
a conduit for feeding LPG from the reservoir to said rail,
a return conduit for returning the LPG fed in excess to the injectors into the reservoir,
sensor means for sensing the LPG level in the reservoir, said electronic control means being adapted to controlling switching between the gasoline operation mode and the LPG operation mode and being further adapted to controlling the LPG injectors, said electronic control means being further adapted to automatically switching the system from the LPG mode to the gasoline mode when said sensor means detect a level of LPG in the reservoir below admissible value, wherein said reservoir includes:
a pump unit, including said pump, arranged within the reservoir, having an intake mouth and an outlet conduit connected to an outlet connecting element opening at the outside of the reservoir,
a return connecting element, also opening at the outside of the reservoir, for connecting said return conduit to the inner chamber of the reservoir, and
said level sensor including a transducer mechanically connected to a float and adapted to send an electric signal indicative of the position of the float, said float and said transducer being both supported by the pump unit and said transducer having an associated outlet electric wire connected at the outside through a cable guiding sleeve which is arranged through the wall of the reservoir.

2. Reservoir according to claim 1, wherein said outlet connecting element, said return connecting element and said cable guiding sleeve are all carried by a single plate connected to the wall of the reservoir.

3. Reservoir according to claim 1, wherein said pump unit includes a canister surrounding the pump, whose structure supports a connecting element for connecting the outlet conduit of the pump to a conduit inside the reservoir which is on its turn connected to said outlet connecting element; a connecting element communicating with the inner chamber of the canister, which is connected to an inner conduit of the reservoir opening in said return connecting element; the structure of the canister further supporting said transducer and the structure of the float.

* * * * *